(12) United States Patent
Jung et al.

(10) Patent No.: US 11,614,139 B2
(45) Date of Patent: Mar. 28, 2023

(54) ABSORPTION OF VIBRATIONS OF A DISTRIBUTOR BOOM OF AN AGRICULTURAL DISTRIBUTING MACHINE

(71) Applicant: Deere & Company, Moline, IL (US)

(72) Inventors: Benedikt Jung, Kaiserslautern (DE); Christian Waibel, Mannheim (DE); Martin Seimetz, Heusweiler (DE)

(73) Assignee: DEERE & COMPANY, Moline, IL (US)

( * ) Notice: Subject to any disclaimer, the term of this patent is extended or adjusted under 35 U.S.C. 154(b) by 552 days.

(21) Appl. No.: 16/740,161

(22) Filed: Jan. 10, 2020

(65) Prior Publication Data

US 2020/0224744 A1 Jul. 16, 2020

(30) Foreign Application Priority Data

Jan. 10, 2019 (DE) .......................... 102019200252.8

(51) Int. Cl.
*A01M 7/00* (2006.01)
*F16F 7/10* (2006.01)
*F16F 7/104* (2006.01)
*F16F 15/00* (2006.01)

(52) U.S. Cl.
CPC ......... *F16F 7/1005* (2013.01); *A01M 7/0057* (2013.01); *F16F 7/104* (2013.01); *F16F 15/002* (2013.01); *F16F 2222/08* (2013.01)

(58) Field of Classification Search
CPC . A01D 41/127; A01D 41/1274; B60W 30/18; B60W 30/18009; F16F 7/104; F16F 7/1005; F16F 15/002; F16F 2222/08; A01M 7/0057

USPC .......................................... 56/10.2 E, 10.2 R
See application file for complete search history.

(56) References Cited

U.S. PATENT DOCUMENTS

| 9,832,926 B2 * | 12/2017 | Jung .................... A01D 41/127 |
| 2006/0290662 A1 * | 12/2006 | Houston ................. A63F 13/06 345/156 |
| 2014/0263766 A1 | 9/2014 | Venton-Walters |
| 2019/0233345 A1 * | 8/2019 | Avgousti ................ C05C 9/005 |
| 2021/0291362 A1 * | 9/2021 | Pivac ................... B25J 19/0091 |

FOREIGN PATENT DOCUMENTS

| DE | 10054285 A1 | 5/2002 |
| DE | 102008007312 A1 | 8/2009 |
| DE | 102014203005 B3 | 5/2015 |
| DE | 102015204992 B3 | 4/2016 |
| DE | 102015113721 A1 | 2/2017 |
| DE | 102017114637 A1 | 12/2018 |
| EP | 2526755 A1 | 11/2012 |
| EP | 2589289 A2 | 5/2013 |
| EP | 2829177 A1 | 1/2015 |
| EP | 2835050 A1 | 2/2015 |
| WO | 2012146255 A1 | 11/2012 |

* cited by examiner

*Primary Examiner* — Christopher P Schwartz

(57) ABSTRACT

An agricultural machine, the machine comprising: a distributor boom; a sensor for detecting a vibration of the distributor boom; an electronic control device in communication with the sensor; and a mobile mass coupled to the distributor boom and associated with an actuator, the electronic control device, upon detection of a vibration in the distributor boom, configured to actuate the actuator to relocate the mobile mass in the direction of the vibration to be damped with respect to the distributor boom.

8 Claims, 1 Drawing Sheet

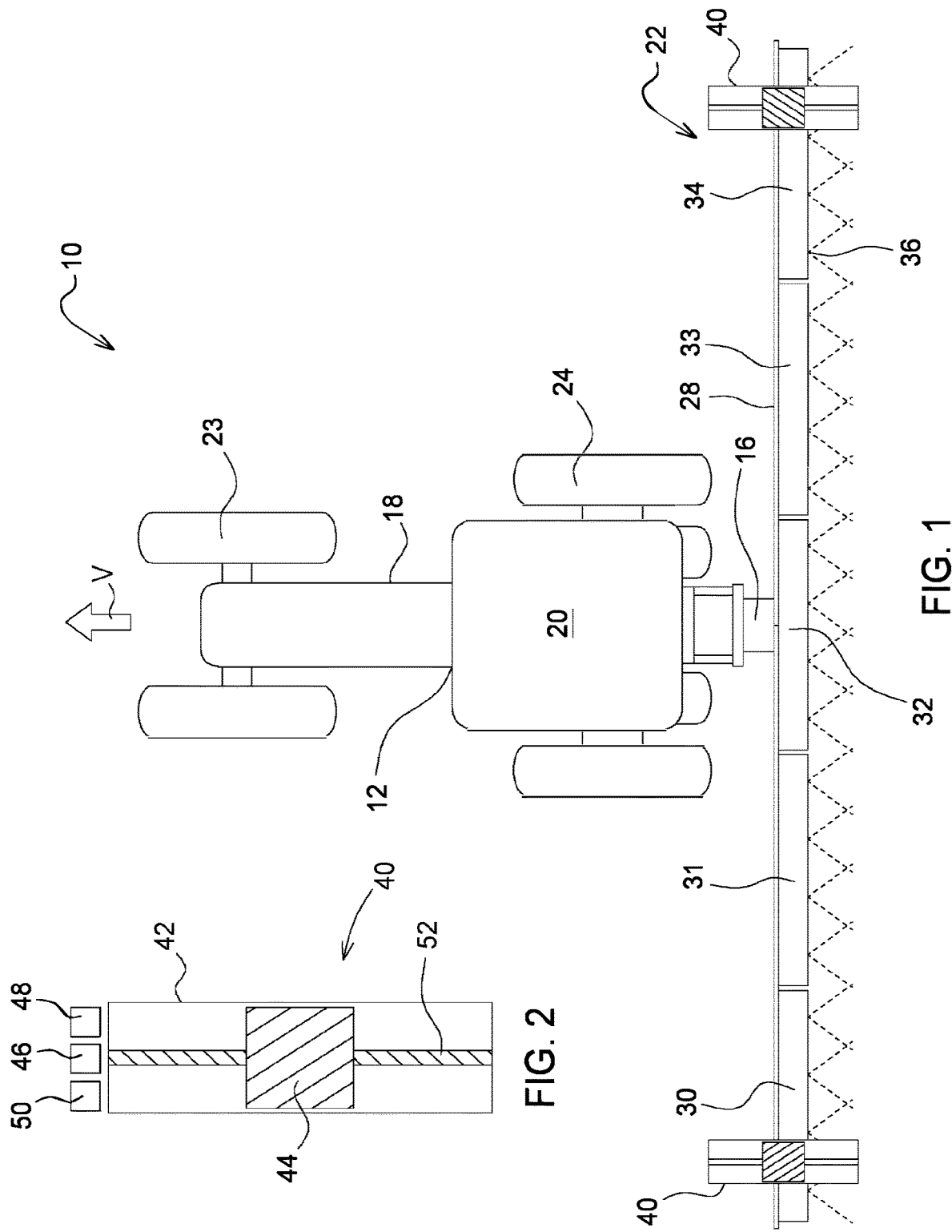

ABSORPTION OF VIBRATIONS OF A DISTRIBUTOR BOOM OF AN AGRICULTURAL DISTRIBUTING MACHINE

The present disclosure relates to an agricultural distributing machine with a distributor boom and with a device for active absorption of vibrations arising in the distributor boom.

BACKGROUND

Field sprayers are used in agriculture in order to distribute spray agent on a field for the purpose of fertilizing a field or for the purpose of combating undesirable organisms (such as weeds, fungi or insects) that are present there. Such field sprayers are available as realized forms which are attached to a carrier vehicle or which are semi-mounted, self-driving or drawn. In order to achieve an adequate working width (e.g., at least 10 meters), they are equipped with booms carrying spray nozzles, which can be relocated between a folded-up transportation position for road travel and an extended working position for field operation. The booms are conventionally designed to be relatively rigid in the vertical direction, in order to guarantee a constant spacing between the ground and the spray nozzles and consequently to guarantee compliance with the desired rates of application, whereas for reasons of weight and cost they are designed to be less rigid in the forward direction. However, this has the disadvantageous consequence that the booms can acquire vibratory motions in the forward direction, for example if the field sprayer—or a vehicle carrying it—decelerates or accelerates or drives around a curve. The amplitudes of vibratory motions of such a type may be of the order of magnitude of 1 meter or more, having the undesirable consequence that the desired rates of application cannot be complied with locally.

SUMMARY

Various aspects of examples of the present disclosure are set forth in the claims. An agricultural machine, the machine comprising: a distributor boom; a sensor for detecting a vibration of the distributor boom; an electronic control device in communication with the sensor; and a mobile mass coupled to the distributor boom and associated with an actuator, the electronic control device, upon detection of a vibration in the distributor boom, configured to actuate the actuator to relocate the mobile mass in the direction of the vibration to be damped with respect to the distributor boom.

A vibration absorption system for an agricultural machine with a distributor boom, the system comprising: a sensor for detecting a vibration of the distributor boom; an electronic control device in communication with the sensor; and a mobile mass coupled to the distributor boom and associated with an actuator, the electronic control device, upon detection of a vibration in the distributor boom, configured to actuate the actuator to relocate the mobile mass in the direction of the vibration to be damped with respect to the distributor boom.

Accordingly, there is proposed an active damping of vibrations of the distributor boom with a mass which is coupled with the distributor boom and which is relocatable by an actuator along the direction of the vibration to be damped. The actuator is driven in phase opposition to the vibration by an electronic control unit on the basis of the signal of a sensor which has been set up to detect a possible vibration, said sensor being, for instance, an acceleration-sensor. Accordingly, should the boom move, for instance, forwards in a vibration, the actuator will move the mass rearwards, in order to damp the vibration, and conversely. Analogously, the actuator can move the mass downwards if the boom moves upwards, and conversely. In this way, with simple means an effective damping of vibrations is obtained which is also able to damp down varying vibration frequencies. Preferentially, in each instance two actuators and masses have been mounted on both sides of a plane of symmetry of the distributor boom.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 1 shows a top view of an agricultural distributing machine with a device for damping vibrations in the distributor boom; and FIG. 2 shows an enlarged representation of a device for active absorption of vibrations of the distributor boom.

DETAILED DESCRIPTION

The object underlying the invention is seen in making available an agricultural distributing machine with a boom, and in making available a corresponding method, in which machine the aforementioned disadvantages do not arise or arise only to a lesser extent.

Previous attempts have been proposed in the state of the art in order to combat vibratory motions of such a type passively or actively. For example, German Patent Appl. No. DE 100 54 285 A1 proposes to detect the motions of the boom in the forward direction, and to absorb them by virtue of actuators acting in the opposite direction which act on the two boom halves (arranged to the left and to the right of the longitudinal axis) at a distance from the longitudinal axis of the field sprayer and at the other end have been joined to the frame of the field sprayer by articulation. An arrangement of such a type is also described in the periodical *Landtechnik* 2015, pages 132 to 138.

Furthermore, German Patent Appl. No. DE 10 2008 007 312 A1 proposes to mount at each of the outer ends of the boom halves a vibration-absorber which is composed of a mass and a spring. The mass is not driven actively and is intended to extinguish the vibratory motions of the boom automatically. An arrangement of such a type is also described in the periodical *Landtechnik* 2015, pages 132 to 138, and in US 2014/0263766 A1. European Patent Appl. Nos. EP 2 526 755 A1, EP 2 589 289 A2, EP 2 835 050 A1 and EP 2 829 177 A1 generally propose to mount damping elements within the boom, the damping properties of said elements being variable as a function of the type of motion of the field sprayer.

German Patent Appl. Nos. DE 10 2015 113 721 A1 and DE 10 2017 114 637 A1 propose, for the purpose of active absorption of vibrations, to move the boom as a whole in the forward direction in relation to the frame of the field sprayer, in order to lessen the effects of linear decelerations or accelerations of the field sprayer on the boom, whereas German Patent Appl. No. DE 10 2014 203 005 B3 proposes to apply a first signal to an actuator for the purpose of relocating a vertically adjustable boom, or a boom that is capable of rotating about an axis extending in the forward direction, of a field sprayer in response to a relocating command, and subsequently to apply thereto a second signal that has the consequence that the vibration induced in the boom by the first signal is extinguished.

Lastly, in German Patent Appl. No. DE 10 2015 204 992 B3 it is proposed to absorb the vibration of the boom by virtue of air-expelling nozzles which have been mounted on the boom, whereas WO 2012/146255 A1, which is regarded as generic, proposes to damp vertical vibrations in the boom of a field sprayer by means of a mass that is mobile in the longitudinal direction of the boom.

The damping of the vibrations by virtue of active actuators arranged between the chassis and the boom requires a longitudinally adjustable connection between the boom and the chassis of the field sprayer, which already by reason of its length is very costly, this holding analogously also for the active absorption of vibrations by relocation of the position of the entire boom in relation to the chassis. The action of the passive damping elements is not always satisfactory, and the absorption of vibrations by virtue of air nozzles has only poor efficiency. Finally, the arrangement according to WO 2012/146255 A1 is only suitable for damping vertical vibrations.

FIGS. 1 and 2 shows separately a combination 10 consisting of an agricultural tractor 12 and a distributing machine 22 in the form of a field sprayer which is attached to a three-point boom 16 of the tractor 12. The tractor 12 stands on a bearing chassis 18 which is supported on steerable front wheels 23 and on drivable rear wheels 24 and bears a cabin 20 in which an operator's workstation is located. In a different realized form, the distributing machine 22 could be drawn by the tractor 12—that is to say, it could include a chassis with wheels and with a drawbar hitched up to a coupling of the tractor 12, or could have been realized as a self-driving vehicle.

The distributing machine 22 includes a distributor boom 28 which is composed of a total of five sections 30 to 34 which have been coupled with one another in a foldable manner, in order to be able to reduce the width of the distributor boom 28 for road travel to a fraction of the working width thereof. Spray nozzles 36 for applying spray agent on a field have been distributed along the width of the distributor boom 28, in which connection the rates of application may be fixed or variable in georeferenced or sensor-controlled manner.

The distributor boom 28 is of relatively stable construction in the lateral direction (horizontally and at right angles to the forward direction V of the tractor 12), this also holding—to a somewhat lesser extent—for the vertical direction. In the forward direction V, however, the distributor boom 28 is less stable. This has the consequence that, in the event of accelerations or decelerations of the tractor 12 or in the event of other perturbations (cornering, ground irregularities etc.), vibrations may arise in the distributor boom 28—that is to say, the distributor boom 28 buckles into itself, and the outer ends of the distributor boom 28 move forwards and rearwards in relation to its central region fastened to the tractor 12. Vibrations of such a type have, amongst other things, the disadvantageous consequence that some places in the field are subjected to larger amounts of spray agent than desired, and other places, in turn, receive less spray agent than intended.

For the purpose of avoiding or lessening these vibrations of the distributor boom 28 forwards and rearwards, two devices 40 serve for active absorption of vibrations, one of which has been mounted respectively in the vicinity of an outer end of the distributor boom 28. The device 40 for active absorption of vibrations comprises, in each instance, a housing 42 fastened to the outer section 30 or 34 of the distributor boom 28, in which a mass 44 is supported so as to be displaceable on a guide 52 along the forward direction V, an actuator 46 for relocating the position of the mass 44 within the housing 42 along the guide 52, a sensor 48 for detecting a vibration, and an electronic control unit 50 which is connected to the sensor 48 and to the actuator 46. The sensor 48 may be, for instance, an inertial acceleration-sensor. The actuator 46 may be a linear actuator, for example in the form of a hydraulic cylinder, or a rotating actuator, for example in the form of an electric or hydraulic motor which is coupled with the mass 44 via a cable or a screw thread or a toothed rack or such like. For the purpose of improving the mobility of the mass 44, the housing 42 may have been provided with air-permeable openings, or it may also be dispensed with.

In operation, the control device 50 drives the actuator 46 on the basis of the signals of the sensor 48. Should the sensor 48 sense, for example, an acceleration of the distributor boom 28 forwards, the control device 50 causes the actuator 46 to move the mass 44 rearwards, and conversely. In this way, the mass 44 is moved forwards and rearwards in phase opposition to the vibration of the distributor boom 28, and a possible vibration is damped or extinguished rapidly and effectively, in order to avoid or to lessen the problems pointed out above.

It would also be conceivable to employ the devices 40 (or two further devices 40) for the purpose of damping vertical vibrations in the distributor boom 28. The mass 44 would then be relocated by the actuator 46 in the vertical direction, in phase opposition to a vertical vibration of the distributor boom, detected with the sensor 48. Also, both actuators 46 could be controlled jointly or independently of one another with a single control device 50 which could also be located on board the tractor 12 or at an arbitrary place on the distributing machine 22. Also (on the assumption that both halves of the distributor boom 28 move uniformly), one of the sensors 48 could be dispensed with, or one or both of the sensors 48 could have been mounted, at a distance from the actuator 46 and from the mass 44, at a suitable place on board the tractor 12 or on board the distributing machine 22 that is also suitable to detect the vibrations of the distributor boom 28.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of a skilled artisan in light of this disclosure. In addition, those skilled in the art will appreciate that the mechanisms of the subject matter described herein are capable of being distributed as a program product in a variety of forms, and that an illustrative embodiment of the subject matter described herein applies regardless of the type of signal bearing medium used to carry out the distribution. Examples of a signal bearing medium include, but are not limited to, the following: an edge computing module or device; a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a computer system or computing element (or portion thereof) such as, but not limited to, one or more or some combination of: a visual organizer system, a request generator, an Internet coupled computing device, a computer server, etc. In one example, the computer system and/or the computing element may manipulate and transform information and/or data represented as physical (electronic) quantities within the computer system's and/or computing element's processor(s), register(s), and/or memory (ies) into other data similarly represented as physical quantities within the computer system's and/or computing element's memory(ies), register(s) and/or other such information storage, processing, transmission, and/or display components of the computer system(s), computing element (s) and/or other electronic computing device(s). Under the direction of computer-readable instructions, the computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:

1. An agricultural machine, the machine comprising:
    a distributor boom;
    a sensor for detecting a vibration of the distributor boom;
    an electronic control device in communication with the sensor; and
    a movable mass coupled to the distributor boom and associated with an actuator, the movable mass and the actuator positioned in at least a vertical orientation with respect to the distributor boom;
    wherein the electronic control device, upon detection of a vertical vibration in the distributor boom, is to actuate the actuator to displace the movable mass in a vertical direction corresponding to the vibration to dampen the vibration with respect to the distributor boom.

2. The agricultural machine of claim 1, wherein the actuator is further to displace the movable mass in a forward direction with respect to the distributor boom.

3. The agricultural machine of claim 2, wherein the movable mass is relocated based on the vibration of the distributor boom, wherein if a forward vibration is detected by the electronic control, a signal is sent to the actuator to move the movable mass rearwards and if a rearward vibration is detected, a signal is sent to the actuator to move the movable mass forward.

4. The agricultural machine of claim 1, wherein the actuator is driven in phase opposition to the vibration as determined by the electronic control device using a signal of the sensor.

5. The agricultural machine of claim 4, wherein the sensor is an acceleration-sensor.

6. The agricultural machine of claim 1, further comprising at least two actuators and two movable masses mounted on both sides of a plane of symmetry of the distributor boom.

7. The agricultural machine of claim 1, wherein the movable mass is relocated based on the movement of the boom, wherein if a upward movement is detected by the electronic control, a signal is sent to the actuator to move the movable mass in a generally downward direction opposite to the movement and if a downward movement is detected by the electronic control, a signal is sent to the actuator to move the movable mass in a generally upward direction opposite to the movement, in order to damp the vibration.

8. A vibration absorption system for an agricultural machine with a distributor boom, the system comprising:
    a sensor for detecting a vibration of the distributor boom;
    an electronic control device in communication with the sensor; and
    a movable mass coupled to the distributor boom and associated with an actuator, the movable mass and the actuator positioned in at least a vertical orientation with respect to the distributor boom;
    wherein the electronic control device, upon detection of a vertical vibration in the distributor boom, is to actuate the actuator to displace the movable mass in a vertical direction corresponding to the vibration to dampen the vibration with respect to the distributor boom.

* * * * *